United States Patent
Tsumura et al.

(10) Patent No.: US 9,610,832 B2
(45) Date of Patent: Apr. 4, 2017

(54) WEATHER STRIP

(71) Applicants: Japan Vilene Company, Ltd., Tokyo (JP); Toyoda Gosei Co., Ltd., Aichi (JP)

(72) Inventors: Tatsuhiko Tsumura, Shiga (JP); Hirofumi Otsuka, Aichi (JP); Kazuhiro Takahashi, Aichi (JP)

(73) Assignees: JAPAN VILENE COMPANY, LTD., Tokyo (JP); TOYODA GOSEI CO., LTD., Aichi (JP)

( * ) Notice: Subject to any disclaimer, the term of this patent is extended or adjusted under 35 U.S.C. 154(b) by 0 days.

(21) Appl. No.: 14/668,070

(22) Filed: Mar. 25, 2015

(65) Prior Publication Data
US 2015/0273992 A1 Oct. 1, 2015

(30) Foreign Application Priority Data
Mar. 28, 2014 (JP) .................................. 2014-69895

(51) Int. Cl.
*B32B 27/08* (2006.01)
*B60J 10/00* (2016.01)
(Continued)

(52) U.S. Cl.
CPC ........... *B60J 10/0005* (2013.01); *B32B 5/022* (2013.01); *B32B 5/26* (2013.01); *B32B 7/12* (2013.01); *B32B 25/10* (2013.01); *B32B 27/08* (2013.01); *B32B 27/12* (2013.01); *B32B 27/32* (2013.01); *B60J 10/16* (2016.02); *B60J 10/84* (2016.02);
(Continued)

(58) Field of Classification Search
None
See application file for complete search history.

(56) References Cited

U.S. PATENT DOCUMENTS

2011/0143113 A1* 6/2011 Hatta .................. B60J 10/16
428/217
2014/0242333 A1* 8/2014 Oono .................. B32B 15/095
428/141

FOREIGN PATENT DOCUMENTS

JP 2011-173498 9/2011

OTHER PUBLICATIONS

Cramer, Stephen D. Covino, Bernard S., Jr.. (2003). ASM Handbook, vol. 13A—Corrosion: Fundamentals, Testing, and Protection—111.3.1 Natural Rubber (NR), "Rubber Coatings and Linings" by Senkowski et al., pp. 845-850, 6 pages. ASM International. Online version available at: http://app.knovel.com/hotlink/pdf/id:kt007P21Q8/asm-handbook-volume.*

(Continued)

*Primary Examiner* — Laura Powers
(74) *Attorney, Agent, or Firm* — Heslin Rothenberg Farley & Mesiti P.C.

(57) ABSTRACT

An object of the present invention is, even when the design of a weather strip body with a specific gravity of about 0.5 to 0.85 is improved using a nonwoven fabric, to provide a weather strip with excellent trackability and excellent adhesiveness between the weather strip body and the nonwoven fabric. The weather strip of the present invention comprises a weather strip body having a specific gravity of 0.5 to 0.85 and made of an ethylene-propylene copolymer rubber, an adhesive resin sheet comprising random polypropylene and a polypropylene-based thermoplastic elastomer, and a nonwoven fabric, said nonwoven fabric being attached to the weather strip body via the adhesive resin sheet.

4 Claims, 2 Drawing Sheets

(51) Int. Cl.
  *B32B 27/32* (2006.01)
  *B32B 5/02* (2006.01)
  *B32B 5/26* (2006.01)
  *B32B 7/12* (2006.01)
  *B32B 25/10* (2006.01)
  *B32B 27/12* (2006.01)
  *B60J 10/84* (2016.01)
  *B60J 10/16* (2016.01)

(52) U.S. Cl.
  CPC ....... *B32B 2250/03* (2013.01); *B32B 2274/00* (2013.01); *B32B 2307/4026* (2013.01); *B32B 2451/00* (2013.01); *B32B 2581/00* (2013.01); *B32B 2605/00* (2013.01); *Y10T 428/24901* (2015.01); *Y10T 442/678* (2015.04)

(56) References Cited

OTHER PUBLICATIONS

Machine Translation of JP 2011-173498 via AIPN webiste.*

* cited by examiner

WEATHER STRIP

CROSS REFERENCE TO RELATED APPLICATIONS

This application claims priority to Japanese Patent Application No. 2014-69895, filed on Mar. 28, 2014, the entire contents of which are incorporated herein by reference.

TECHNICAL FIELD

The present invention relates to a weather strip.

BACKGROUND ART

In some weather strips, a nonwoven fabric is attached to the design surface of a weather strip body via a resin adhesive layer in order to improve its appearance quality. For example, the applicant of the present application has proposed a weather strip using a nonwoven fabric containing a colored, decorative layer and an uncolored, adhered layer to which an adhesive layer adheres (Patent Literature 1). This weather strip has a strong adhesive strength between the nonwoven fabric and the adhesive layer, and there is no fear that the nonwoven fabric will peel from the adhesive layer.

CITATION LIST

Patent Literature

[Patent Literature 1] JP 2011-173498

SUMMARY OF INVENTION

Technical Problem

On the one hand, it has been attempted, for weight reduction, to use a sponge with a specific gravity of about 0.5 to 0.85 as the weather strip body. However, since the sponge has a high expansion ratio, and thus, is easily deformed, even when such a nonwoven fabric is used, it is impossible to sufficiently follow the deformation of the weather strip body, and wrinkles easily occur when bending. Furthermore, due to the poor adhesiveness between the nonwoven fabric and the sponge, a problem that the nonwoven fabric is easily peeled off has occurred during use.

An object of the present invention is, even when the design of a weather strip body with a specific gravity of about 0.5 to 0.85 is improved using a nonwoven fabric, to provide a weather strip with excellent trackability and excellent adhesiveness between the weather strip body and the nonwoven fabric.

Solution to Problem

The present invention relates to:
[1] a weather strip comprising a weather strip body having a specific gravity of 0.5 to 0.85 and made of an ethylene-propylene copolymer rubber, an adhesive resin sheet comprising random polypropylene and a polypropylene-based thermoplastic elastomer, and a nonwoven fabric, said nonwoven fabric being attached to the weather strip body via the adhesive resin sheet,
[2] the weather strip of [1], wherein the adhesive resin sheet has a 25% modulus strength of 10 to 28 N/5 cm,
[3] the weather strip of [1] or [2], wherein the weather strip body has a 25% modulus strength of 500 kPa or more, and
[4] the weather strip of any one of [1] to [3], wherein the nonwoven fabric is a decorative nonwoven fabric having a decorative layer to which a pigment is adhered with an adhesive at one surface thereof, and wherein, in a thickness direction of the decorative nonwoven fabric, a region between the decorative surface of the decorative nonwoven fabric and an area that is apart from the back surface of the decorative nonwoven fabric by 10 μm constitutes at least the decorative layer.

Advantageous Effects of Invention

The inventors of the present invention found that, as a cause of poor trackability in conventional weather strips, the extension of the adhesive resin sheet intervening between the weather strip body and the nonwoven fabric was poor. In the weather strip of [1] of the present invention, since the adhesive resin sheet contains random polypropylene and a polypropylene-based thermoplastic elastomer, it can be a stretchable adhesive resin sheet, and thus, it can follow the extension of the weather strip body.

Additionally, the use of the adhesive resin sheet comprising random polypropylene and a polypropylene-based thermoplastic elastomer can ensure the adhesiveness with the ethylene-propylene copolymer rubber as the weather strip body, and the peeling off of the nonwoven fabric can be avoided.

Furthermore, the inventors found that, as a cause of the generation of wrinkles when bending, the difference between the weather strip body and the nonwoven fabric in the ease of extension was too large. In the weather strip of [3] of the present invention, since, as the weather strip body, a weather strip body, despite a low specific gravity, with a relatively-high 25% modulus strength (i.e., it is difficult to stretch with a small force) and an extension similar to that of a nonwoven fabric is used, wrinkles are less likely to occur when it is bent.

Still furthermore, the inventors found that the reason why wrinkles were generated in the decorative nonwoven fabric in the case where the weather strip body was made of a highly foamed material was: that when the decorative layer was formed by printing an adhesive containing a pigment to the nonwoven fabric, the decorative layer (the layer having the pigment and the adhesive) was easily localized in the vicinity of the surface of the decorative nonwoven fabric; and therefore, because there co-exists the decorative layer, which contained the adhesive and the pigment and was relatively hard, and difficult to deform, and the fiber layer, which did not contain the adhesive and the pigment and was relatively soft, and easy to deform, the strain generated when the weather strip deformed concentrated easily to the decorative layer of the decorative nonwoven fabric. In the weather strip of [4] of the present invention, so as not to concentrate the strain to the decorative layer, since the hardness of the entire nonwoven fabric is uniform by making the entire nonwoven fabric into a decorative layer as much as possible, wrinkles are less likely to occur when it is bent.

DESCRIPTION OF EMBODIMENTS

Hereinafter, the weather strip of the present invention will be explained with reference to the drawings.

Figure 1:
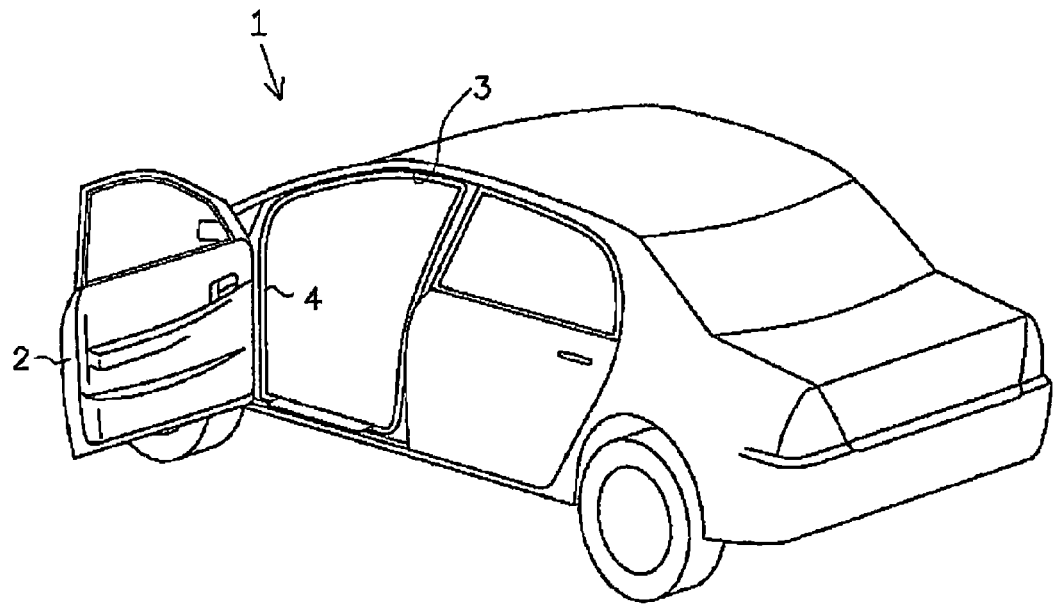
FIG. 1 is a perspective view of a motor vehicle.

As shown in FIG. 1, doors 2 are provided on the sides of an automobile 1 as a vehicle so as to be opened and closed. Weather strips 4 are mounted on the peripheral edges of door openings 3 of the body sides corresponding to the doors 2. The weather strip has an annular shape as a whole, but it need not necessarily be annular. For example, in the lower side portion of the door opening 3, the ends of the weather strip 4 can be located apart from each other, and the space between the ends can be covered with a scuff plate or the like.

Figure 2:
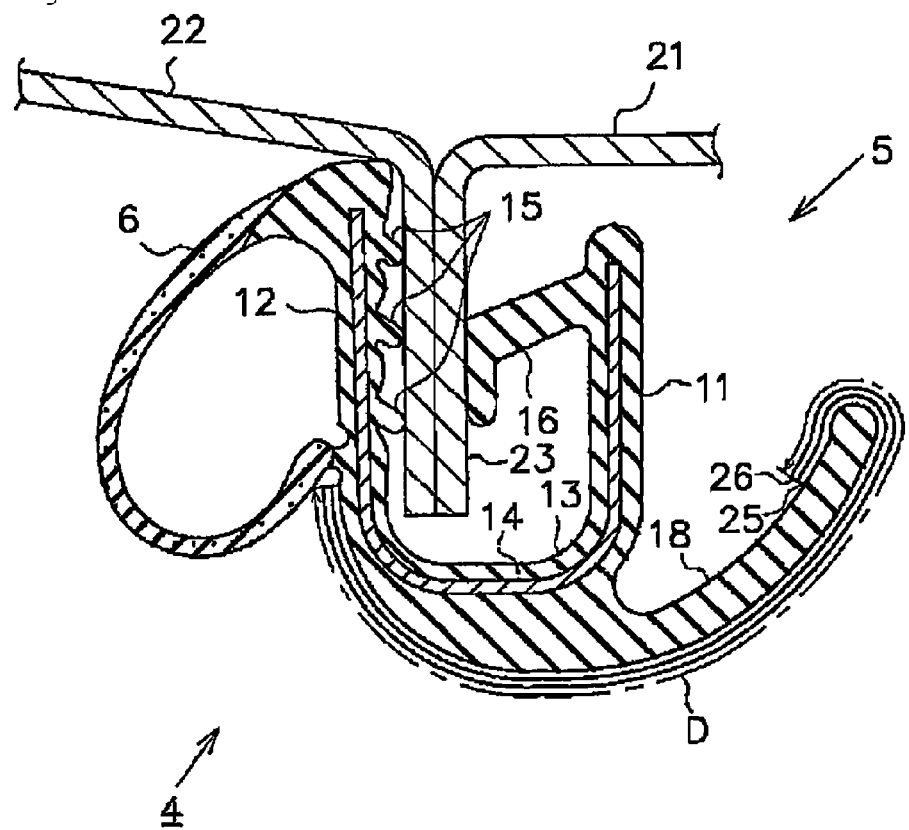
FIG. 2 is a cross-sectional view of a weather strip.

As shown in FIG. 2, the weather strip body has a trim portion 5 and a seal portion 6. The trim portion 5 contains an interior side wall portion 11, an exterior side wall portion 12, and a connecting portion 13 for connecting both side wall portions 11, 12, and forms a substantially U-shaped cross-section as a whole. The trim portion 5 is configured, for example, to embed a metal insert 14 in an EPDM (ethylene-propylene-diene copolymer) sponge rubber.

In the weather strip of the present invention, as a material for the weather strip body, a sponge material made of an ethylene-propylene copolymer rubber and having a specific gravity of 0.5 to 0.85 is used. The 25% modulus strength of the weather strip body is preferably 500 kPa or more, more preferably 680 kPa or more, and still more preferably 700 kPa or more. When, as the weather strip body, a weather strip body, despite a low specific gravity, with a relatively-high 25% modulus strength (i.e., it is difficult to stretch with a small force) and an extension similar to that of a nonwoven fabric is used, wrinkles are less likely to occur when it is bent. The 25% modulus strength and the specific gravity of the ethylene-propylene copolymer rubber may be adjusted, for example, as shown in the Examples described below, by regulating the type of the ethylene-propylene copolymer rubber, the amount of a foaming agent, the degree of vulcanization, and the like.

A plurality of holding lip portions 15, which extend toward the inside of the trim portion 5 (the interior side), are integrally formed on the inner surface (the interior side) of the exterior side wall portion 12. On the other hand, a holding lip portion 16, which extends toward the inside of the trim portion 5 (the exterior side), is integrally formed on the inner surface (the exterior side) of the interior side wall portion 11. A design lip 18, with which the end of an interior component such as a garnish (not shown in the Figures) is covered, is extension-molded on the connecting portion 13. In the present invention, a trim portion in which the insert is not embedded in the inside of the trim portion 5 may be used. Furthermore, the trim portion may be attached to a flange via a double-faced adhesive tape, instead of the holding lip portion 16.

A flange 23 is formed at the peripheral edge of the door opening 3 by joining an inner panel 21 and an outer panel 22 of the body. The weather strip 4 is held at the peripheral edge of the door opening 3 by fitting the trim portion 5 into the flange 23.

The seal portion 6 is integrally provided so as to project to the exterior side of the exterior side wall portion 12, and is configured in a hollow shape, for example, by an EPDM sponge rubber. When the door 2 is closed, the sealing portion 6 is pressed against the peripheral edge of the door 2, and the space between the door 2 and the body of the automobile 1 is sealed.

In the mounted state of the weather strip 4, the outer surface of a range including from the substantial tip portion to the base end portion of the design lip 18, the connecting portion 13 of the trim portion 5, and a connection portion to the seal portion 6 in the exterior side wall portion 12 becomes a design surface D, which appears as appearance. A nonwoven fabric layer 26 consisting of a nonwoven fabric is attached via a sheet-shaped (including film-shaped) adhesive resin sheet layer 25 in the design surface D. In connection with the design surface D, the nonwoven fabric is attached, up to the tip of the design lip 18, and is folded back at the tip of the design lip 18.

The adhesive resin sheet layer 25 is formed from an adhesive resin sheet comprising random polypropylene and a polypropylene-based thermoplastic elastomer. In connection with this, random polypropylene has a good adhesiveness to the ethylene-propylene copolymer rubber, but is harder than the ethylene-propylene copolymer rubber, and is inferior in trackability. The composition improves this deficiency by mixing random polypropylene with the polypropylene-based thermoplastic elastomer having a flexibility similar to the ethylene-propylene copolymer rubber, and both trackability and adhesiveness are achieved. The mass ratio of random polypropylene and the polypropylene-based thermoplastic elastomer is preferably 50:50 to 80:20 so as to achieve both trackability and adhesiveness. The 25% modulus strength of the adhesive resin sheet is preferably 10 to 28 N/5 cm. If it is less than 10 N/5 cm, peeling easily occurs because the adhesiveness decreases. If it is more than 28 N/5 cm, wrinkles easily occur because the trackability decreases. In order to improve the flexibility and adhesiveness of the adhesive resin sheet layer 25, the adhesive resin sheet can contain other olefin-based resins, such as polyethylene, a tackifier, and the like.

The nonwoven fabric for a weather strip, which constitutes the nonwoven fabric layer 26, is preferably a base fabric made mainly of latent crimpable fibers that have been crimped. When the nonwoven fabric for the weather strip is such a base fabric made mainly of latent crimpable fibers, even at the time of attaching it to the weather strip body, it exhibits an appropriate stretchability for the attachment work, and the weather strip can be produced at low cost. The term "latent crimpable fibers" as used herein means, as is well-known, fibers capable of generating a crimp number at least twice the initial crimp number, when the fibers alone are heated in a state where an external force is not applied. The wording "made mainly of latent crimpable fibers" in this base fabric means that the latent crimpable fibers account for 50 mass % or more with respect to all the fibers that constitute the base fabric. In the present invention, the latent crimpable fibers contained in the base fabric account for at least 50 mass % or more, preferably 70 mass % or more, more preferably 90 mass % or more, and most preferably 100 mass %. Other constituent fibers that constitute this base fabric may be appropriately used, in view of techniques for preparing base fabrics, such as passing properties in a card machine, or stainability or the like. A base fabric entangled with one another by water jet is most preferable, because a base fabric with a high density and a thin thickness can be obtained, and the integrity with the design lip can be achieved. The mass per unit area of the base fabric is preferably 80 to 200 g/m$^2$, and more preferably 100 to 150 g/m$^2$ so as to achieve both texture and workability as the nonwoven fabric. The unit for fiber composition as used herein is "mass %", and it may be sometimes simply expressed as "%".

As the latent crimpable fiber, for example, a composite fiber in which two kinds of resins different in melting point are combined, or a fiber which has been partially subjected to a specific thermal hysteresis, may be used. As the composite fiber, for example, a composite fiber which is an eccentric type having a core-sheath structure, or a composite fiber which is a side-by-side (bonded) type, may be preferably used. Examples of the combination of resins different in melting point include various combinations of synthetic resins, such as polyester/low melting point polyester, polyamide/low melting point polyamide, polyester/low melting point polyamide, polyester/polypropylene, polypropylene/low melting point polypropylene, polypropylene/polyethylene, and the like. More particularly, a latent crimpable fiber consisting of polyester/low melting point polyester is preferred, because it is excellent in heat resistance and stretchability after crimp forming. As the fiber which has been partially subjected to a specific thermal hysteresis, for example, a fiber to which the thermal hysteresis is imparted by passing a fiber made of polyester, polyamide, polyacrylonitrile, or the like, while a single side of the fiber is brought into contact with a heated blade, may be used.

As fibers other than the latent crimpable fiber, a fiber in which a substantial increase in the number of crimps by heating is not caused may be used. Examples thereof include generally and widely used fibers, such as polyester fibers, nylon fibers, polyolefin fibers, polyacrylic fibers, rayon fibers, cotton, wool, and the like, and composite fibers in which a substantial increase in the number of crimps by heating is not caused. As such composite fibers, for example, a core-sheath type composite fiber consisting of a combination of dyeable polyester/polyamide resins or the like may be used. The term "a fiber in which a substantial increase in the number of crimps by heating is not caused" as used herein means a fiber in which, even if some increase occurs when the fibers alone are heated in a state that an external force is not applied, the increase in the number of crimps is less than 50% of the initial crimp number.

The nonwoven fabric layer 26 is preferably formed from a decorative nonwoven fabric having a decorative layer, which appears on the outer surface, and to which a pigment is adhered with an adhesive.

The pigment used in the decorative layer is not limited, so long as it is a generally used pigment for printing, and its color can be appropriately adjusted in accordance with a target color. In the case where the decorative layer is made in a dark color such as black, it is preferable that the nonwoven fabric is stained in black with a disperse dye, and then, is colored mainly using a black pigment such as carbon black, because the light resistance is improved in comparison with the case where the nonwoven fabric is stained with a disperse dye alone.

The adhesive used in the decorative layer is preferably an acrylic resin or an urethane resin, in view of light resistance, trackability, adhesiveness, and the like.

The thickness of the nonwoven fabric layer is generally 300 to 600 µm. It is preferable that, in the thickness direction of the decorative nonwoven fabric, a region between the decorative surface of the decorative nonwoven fabric and an area that is apart from the back surface of the decorative nonwoven fabric by 10 µm constitutes at least the decorative layer, and a decorative nonwoven fabric consisting of the decorative layer alone is more preferable. A decorative nonwoven fabric in which most of the nonwoven fabric layer is occupied by the decorative layer may be prepared, for example, by applying an adhesive solution containing a pigment with a low viscosity, and/or by applying an adhesive solution containing a pigment twice or more.

The inventors found that the reason why wrinkles were generated in the decorative nonwoven fabric in the case where the weather strip body was made of a highly foamed material was: that when the decorative layer was formed by printing an adhesive containing a pigment to the nonwoven fabric, the decorative layer (the layer having the pigment and the adhesive) was easily localized in the vicinity of the surface of the decorative nonwoven fabric; and therefore, because there co-exists the decorative layer, which contained the adhesive and the pigment and was relatively hard, and difficult to deform, and the fiber layer, which did not contain the adhesive and the pigment and was relatively soft, and easy to deform, the strain generated when the weather strip deformed easily concentrated to the decorative layer of the decorative nonwoven fabric. So as not to concentrate the strain to the decorative layer, when the hardness of the entire nonwoven fabric is uniform by making the entire nonwoven fabric into a decorative layer as much as possible, wrinkles are less likely to occur when it is bent.

Figure 4:
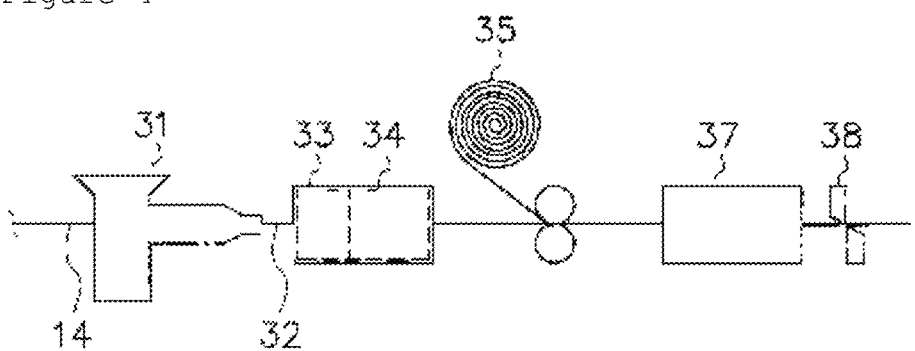
FIG. 4 is a schematic view showing part of a production line for a weather strip.

Hereinafter, the process for producing the weather strip of the present invention will be explained. FIG. 4 is a schematic view showing part of a production line for a weather strip. The weather strip is produced while it is transferred from the left to the right in FIG. 4.

Figure 3:
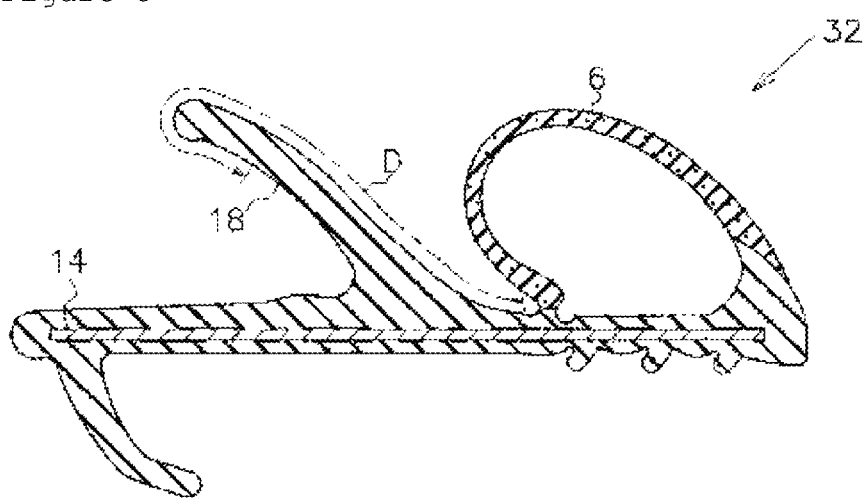
FIG. 3 is a cross-sectional view showing an intermediate form of a weather strip.

First, in an extrusion step, an insert 14 is continuously supplied along with, for example, an EPDM unvulcanized rubber to a rubber extruder 31. An intermediate form 32 (see FIG. 3), which becomes a weather strip body, is extruded from a die of the rubber extruder 31 in a state that the insert 14 is coated with the EPDM unvulcanized rubber. In this step, the intermediate form is extruded in the shape of a substantially flat plate, in a state that the portion into which the insert 14 is embedded, corresponding to the trim portion 5, and is opened, as shown in FIG. 3.

In a subsequent vulcanization process, the extruded intermediate form 32 is guided to an ultra-high-frequency vulcanizing tank (UHF) 33, and is subjected to primary vulcanization. Next, it is guided to a hot air vulcanizing tank (HAV) 34, and a secondary vulcanization is carried out to complete vulcanization.

Next, in a nonwoven-fabric-layer forming step, a nonwoven fabric layer 26 is formed on the intermediate form 32. More particularly, a nonwoven fabric 35, which has been prepared in advance, is fed, and is compression-bonded to a portion corresponding to the design surface D of the intermediate form 32, which has been raised to a relatively high temperature immediately after vulcanization.

Hereinafter, the process for producing the nonwoven fabric 35 will be explained. First, a nonwoven fabric is produced. As the production method, any conventional method, for example, a wet method, a dry method, a water jet method, and the like, may be employed. The decorative nonwoven fabric having the decorative layer is formed by printing an adhesive containing a pigment to the nonwoven fabric.

The adhered layer side of the decorative nonwoven fabric (the opposite side of the decorative nonwoven fabric) is lined, by thermal fusion, with the adhesive resin sheet, which becomes the adhesive resin sheet layer 25, and which contains random polypropylene and a polypropylene-based thermoplastic elastomer. The laminate nonwoven fabric 35 is completed.

The laminate nonwoven fabric 35 is compression-bonded to the intermediate form 32, and as a result, the adhesive resin sheet is melted, and the laminate nonwoven fabric 35 is thermally-fused to the intermediate form 32.

The intermediate form 32, which has been passed through the nonwoven-fabric-layer forming step, is subjected to a bending work using a bending machine 37, to form the trim portion 5 having a substantially U-shaped cross-section. Next, the weather strip can be obtained by cutting it to a predetermined size using a cutter 38.

EXAMPLES

The present invention now will be further illustrated by, but is by no means limited to, the following Examples.

Example 1

(1) Preparation of Weather Strip Body (Preparation of Ethylene-Propylene-Diene Copolymer Rubber)

The ethylene-propylene-diene copolymer rubbers, as shown in Table 1, were prepared by regulating the amount of a foaming agent and the degree of vulcanization. With respect to the 25% modulus, the modulus when each rubber was extended by 25% was measured with reference to JIS K6251. The specific gravity was measured by a water displacement method.

TABLE 1

|    | 25% Modulus (kPa) | Specific gravity (g/mL) |
|----|-------------------|-------------------------|
| R1 | 539               | 0.71                    |
| R2 | 709               | 0.78                    |
| R3 | 568               | 0.67                    |

(2) Preparation of Nonwoven Fabric

Parallel webs obtained by opening 100% polyester-based latent crimpable fibers (manufactured by Toray Industries, Inc., TORAY TETORON T-25, side-by-side type, polyester/low melting point polyester, 2.2 dtex×51 mm) using a card machine were used to form a cross-laid web using a cross layer, and another parallel web obtained in a similar fashion was laminated on the cross-laid web to form a crisscross web.

The crisscross web was entangled to one another by applying a high pressure water jet having a pressure of 9 MPa onto both surfaces of the web, and was supplied to a hot air heating furnace at a temperature of 195° C. to generate the crimps of the latent crimpable fibers, and a stretchable nonwoven fabric (mass per unit area: 120 g/m², thickness: 0.7 mm) was obtained.

(3) Preparation of Print Liquid

A thickener (manufactured by Lubrizol Corp., Carbopol 940) was added to an acrylic resin [manufactured by DIC Corporation, VONCOAT 3218-E (Tg: −34° C.) and VONCOAT E-240N (Tg: −5° C.), Tg (when they are mixed at a solid content ratio of 1:1): −20° C.] containing a black pigment (manufactured by DIC Corporation, RYUDYE-W BLACK RC, material: carbon black, carbon black content: 25 mass %) to prepare paste A having a viscosity of 10000 mPa·s (measured with a B-type viscometer manufactured by Brookfield).

The same thickener was added to the same acrylic resin containing the same black pigment to prepare paste B having a viscosity of 3000 mPa·s (measured with a B-type viscometer manufactured by Brookfield).

(4) Preparation of Decorative Nonwoven Fabric

A decorative nonwoven fabric a (mass per unit area: 150 g/m², thickness: 444 μm, amount of print resin: 30 g/m², the depth of a region into which the resin-adhered pigment did not penetrate: 140 μm) was prepared by printing the paste A to the stretchable nonwoven fabric once, using a rotary screen printing machine.

A decorative nonwoven fabric b (mass per unit area: 150 g/m², thickness: 472 μm, amount of print resin: 30 g/m², the depth of a region into which the resin-adhered pigment did not penetrate: 59 μm) was prepared by printing the paste A to the stretchable nonwoven fabric twice, using a rotary screen printing machine.

A decorative nonwoven fabric c (mass per unit area: 150 g/m², thickness: 439 μm, amount of print resin: 30 g/m², the depth of a region into which the resin-adhered pigment did not penetrate: 29 μm) was prepared by printing the paste B to the stretchable nonwoven fabric once, using a rotary screen printing machine.

A decorative nonwoven fabric d (mass per unit area: 150 g/m², thickness: 460 μm, amount of print resin: 30 g/m², the depth of a region into which the resin-adhered pigment did not penetrate: 7 μm) was prepared by printing the paste B to the stretchable nonwoven fabric twice, using a rotary screen printing machine.

(5) Preparation of Decorative-Nonwoven-Fabric/Adhesive-Resin Composite Sheet

The decorative-nonwoven-fabric/adhesive-resin composite sheets (laminate nonwoven fabrics) of the combinations, as shown in Table 3, were prepared by dry-blending random propylene (manufactured by Prime Polymer Co., Ltd., Prime Polypro F329RA) and a polypropylene-based soft block thermoplastic elastomer (manufactured by Prime Polymer Co., Ltd., PRIME TPO M142E) at the mass ratios, as shown in Table 2, and laminating each adhesive resin sheet, which was melt-extruded using a T die, directly to the decorative nonwoven fabrics a to d.

In parallel with this, adhesive resin sheets alone were formed by carrying out melt-extrusion using the T die under the same conditions, and the thickness and the 25% modulus were measured. The results are shown in Table 2.

The thickness was measured using a thickness gauge (manufactured by Mitutoyo Corporation, code No. 547-321, measuring force: 1.5 N or less).

The 25% modulus (N/5 cm) was measured as follows:

(1) The adhesive resin sheets were cut into a rectangular shape with a width of 5 cm and a length of 15 cm to prepare samples.

(2) Each of the samples was fixed between the chuck (distance: 10 cm) of a tensile strength tester, and was pulled at a pulling speed of 20 cm/min. The stress when the distance between the chuck became 12.5 cm was measured.

(3) The stress was measured for three samples by repeating the operations (1) and (2), and the arithmetic average thereof was regarded as the 25% modulus.

TABLE 2

|    | Materials | 25% Modulus (N/5 cm) | Thickness (μm) |
|----|-----------|----------------------|----------------|
| H1 | Random PP: 100% | 29.4 | 45 |
| H2 | PP-based soft block TPO: 100% | 7.9 | 45 |
| H3 | Random PP:PP-based soft block TPO = 70:30 | 20.4 | 45 |

TABLE 3

|  | Ex. 1 | Ex. 2 | Comp. 1 | Comp. 2 | Comp. 3 |
|---|---|---|---|---|---|
| Adhesive resin sheet | H3 | H3 | H1 | H1 | H1 |
| Decorative nonwoven fabric | d | a | b | c | a |

|  | Comp. 4 | Comp. 5 | Comp. 6 | Comp. 7 |
|---|---|---|---|---|
| Adhesive resin sheet | H2 | H1 | H2 | H1 |
| Decorative nonwoven fabric | a | a | a | a |

Ex.: Example
Comp.: Comparative Example (6) Preparation of Weather Strip

Weather strip bodies in which a metal insert (14 in FIG. 3) was embedded, having the shape as shown in FIG. 3, were formed by providing the metal insert, while melt-extruding the ethylene-propylene-diene copolymer rubbers, as shown in Table 1. Subsequently, in accordance with the combinations as shown in Table 4, the adhesive resin sheet surface of each of the decorative-nonwoven-fabric/adhesive-resin composite sheets (laminate nonwoven fabrics) was directly adhered to the design surface (D in FIG. 3) of each of the melted rubbers, separately, to prepare weather strips.

TABLE 4

|  |  | Ex. 1 | Ex. 2 | Comp. 1 | Comp. 2 | Comp. 3 |
|---|---|---|---|---|---|---|
| Weather strip base | | R2 | R2 | R2 | R2 | R2 |
| Adhesive resin sheet | | H3 | H3 | H1 | H1 | H1 |
| Decorative nonwoven fabric | | d | a | b | c | a |
| [A] | [C] | 197 | 181 | 367 | 312 | 270 |
|  | [D] | A | A | F | F | C |
| [B] | [E] | 8.1 | 7.2 | 10.1 | 10.5 | 7.4 |
|  | [F] | A | A | A | A | A |

|  |  | Comp. 4 | Comp. 5 | Comp. 6 | Comp. 7 |
|---|---|---|---|---|---|
| Weather strip base | | R2 | R3 | R3 | R1 |
| Adhesive resin sheet | | H2 | H1 | H2 | H1 |
| Decorative nonwoven fabric | | a | a | a | a |
| [A] | [C] | 175 | 328 | 146 | 412 |
|  | [D] | A | F | A | F |
| [B] | [E] | 3.5 | 10.4 | 4 | 8.6 |
|  | [F] | F | A | F | A |

[A]: Trackability
[B]: Adhesiveness
[C]: Depth of wrinkles (mm)
[D]: Evaluation
[E]: Peeling (N/5 mm)
[F]: Evaluation
<Evaluation>
A: Excellent
C: Fair
F: Failure Experimental Example 1

Evaluation of Trackability

Each of the weather strips was fixed to a jig having a curve of R35 by bending it into a U-shaped cross-section so that the design surface was exposed to the outside. A cut was placed in the thickness direction, in the decorative nonwoven fabric on the R35 curve portion, and the cross-section in the thickness direction of the decorative nonwoven fabric was photographed to measure the height difference between the recessed/projecting parts on the surface of the decorative nonwoven fabric. The height difference between the recessed/projecting parts was regarded as the wrinkle depth.

The trackability was evaluated as follows, from an appearance evaluation of wrinkles visually and the wrinkle depth when each weather strip was fixed. In the case where the wrinkle depth was 200 µm or less, since wrinkles were inconspicuous, the trackability was evaluated as A (excellent). In the case where the wrinkle depth was 200 to 300 µm, since wrinkles were slightly conspicuous, the trackability was evaluated as C (fair). In the case where the wrinkle depth was more than 300 µm, since wrinkles were conspicuous, the trackability was evaluated as F (failure). These results are shown in Table 4.

Experimental Example 2

Evaluation of Adhesiveness

Samples with a width of 5 mm and a length of 10 cm were collected from each weather strip, and the end of each sample was peeled off between the weather strip body and the decorative-nonwoven-fabric/adhesive-resin composite sheet (laminate nonwoven fabric). The sample was fixed between the chuck (distance between the chuck: 2 cm) of a tensile strength tester, and was pulled at a speed of 20 cm/min. The strength required for peeling off (average excluding the value immediately after the beginning of the pulling) was measured, and was regarded as the adhesiveness.

In the case where the strength was 5 N/5 mm or more, since the adhesion force was excellent, the adhesiveness was evaluated as A (excellent). In the case where the strength was less than 5 N/5 mm, since the adhesion force was poor, the adhesiveness was evaluated as F (failure). These results are shown in Table 4.

<<Discussion>>

It was confirmed from the comparison of Example 2 with Comparative Examples 3 and 4 that the trackability and the adhesiveness were excellent, because the adhesive resin sheet contained random polypropylene and a polypropylene-based thermoplastic elastomer.

It was confirmed from the comparison of Example 1 with Comparative Example 2 that when the depth of a region into which the resin-adhered pigment did not penetrate was 10 µm or less, the trackability was excellent and wrinkles did not easily occur.

INDUSTRIAL APPLICABILITY

The weather strip of the present invention can be used by mounting it on the peripheral edge of a door or a door opening of a vehicle, such as an automobile.

REFERENCE SIGNS LIST

1 . . . automobile, 2 . . . door, 3 . . . door opening, 4 . . . weather strip, 5 . . . trip portion, 6 . . . seal portion, 18 . . . design lip, 25 . . . adhesive resin sheet layer, 26 . . . nonwoven fabric layer, D . . . design surface.

The invention claimed is:

1. A weather strip comprising a weather strip body having a specific gravity of 0.5 to 0.85 and made of an ethylene-propylene copolymer rubber, an adhesive resin sheet comprising a mixture of random polypropylene and a polypropylene-based thermoplastic elastomer, and a nonwoven fabric, said nonwoven fabric being attached to the weather strip body via the adhesive resin sheet, wherein the nonwoven fabric is a decorative nonwoven fabric having a decorative layer that comprises an adhesive containing a pigment printed on one surface of the nonwoven fabric, and wherein, in a thickness direction of the decorative nonwoven fabric, the thickness of a region into which the adhesive containing the pigment is not penetrated in the decorative nonwoven fabric is 10 μm or less.

2. The weather strip according to claim 1, wherein the adhesive resin sheet has a 25% modulus strength of 10 to 28 N/5 cm.

3. The weather strip according to claim 1, wherein the weather strip body has a 25% modulus strength of 500 kPa or more.

4. The weather strip according to claim 2, wherein the weather strip body has a 25% modulus strength of 500 kPa or more.

\* \* \* \* \*